United States Patent
Cupertino

(10) Patent No.: US 9,683,826 B2
(45) Date of Patent: Jun. 20, 2017

(54) MEASUREMENT DEVICE WITH MULTIPLE FIXED DISTANCES

(71) Applicant: Ronaldo P. Cupertino, Atlanta, GA (US)

(72) Inventor: Ronaldo P. Cupertino, Atlanta, GA (US)

( * ) Notice: Subject to any disclaimer, the term of this patent is extended or adjusted under 35 U.S.C. 154(b) by 86 days.

(21) Appl. No.: 14/572,323

(22) Filed: Dec. 16, 2014

(65) Prior Publication Data

US 2015/0168120 A1    Jun. 18, 2015

Related U.S. Application Data

(60) Provisional application No. 61/916,863, filed on Dec. 17, 2013.

(51) Int. Cl.
*G01B 3/30* (2006.01)
*E04F 21/00* (2006.01)

(52) U.S. Cl.
CPC ............ *G01B 3/30* (2013.01); *E04F 21/0007* (2013.01)

(58) Field of Classification Search
CPC ........ G01B 3/30; E04F 21/00; E04F 21/0007; E04F 21/0015; E04F 21/003; E04F 21/0092
USPC ........ 33/194, 526, 527, 567, 567.1, DIG. 20
See application file for complete search history.

(56) References Cited

U.S. PATENT DOCUMENTS

| | | | | |
|---|---|---|---|---|
| 2,536,401 A * | 1/1951 | Victor | .................. | G01B 3/30 33/567 |
| 3,426,436 A | 2/1969 | Perwas | | |
| 4,584,774 A * | 4/1986 | Link | .................. | G01B 3/30 33/202 |
| D308,831 S * | 6/1990 | MacLean | .................. | D10/64 |
| 4,989,336 A * | 2/1991 | Waltrip, Jr. et al. | ...... | B25H 7/00 269/904 |
| 5,329,703 A | 7/1994 | Craig | | |
| 5,604,988 A * | 2/1997 | Costelloe | ............... | B25H 7/02 33/194 |
| 5,737,844 A * | 4/1998 | Brumley | ................. | B25H 7/00 33/194 |

(Continued)

FOREIGN PATENT DOCUMENTS

GB     1596842 A  *  9/1981  ............ G01B 3/30
WO  WO 2009036164 A2 * 3/2009 ........ A47G 27/0487

OTHER PUBLICATIONS

Cupertino, Ronaldo P.; Issue Notification for Design U.S. Appl. No. 29/476,403, filed Dec. 13, 2013, mailed Jan. 14, 2015, 1 pg.
Cupertino, Ronaldo P.; Notice of Allowance for U.S. Appl. No. 29/476,403, filed Dec. 13, 2013, mailed Dec. 9, 2014, 6 pgs.
Cupertino, Ronaldo P.; U.S. Design Application entitled: Measurement Device With Multiple Defined Distances, having U.S. Appl. No. 29/476,403, filed Dec. 13, 2013, 7 pgs.

(Continued)

*Primary Examiner* — R. A. Smith
(74) *Attorney, Agent, or Firm* — Taylor English Duma LLP

(57) ABSTRACT

Disclosed is a measurement device including a first measurement element including a base surface and an upper surface, the upper surface of the first measurement element spaced apart from the base surface of the first measurement element by a first height; and a second measurement element including a base surface and an upper surface, the upper surface of the second measurement element spaced apart from the base surface of the second measurement element by a second height, the second height greater than the first height and the second measurement element attached to the first measurement element. The measurement device can function as a spacer to gauge short distances such as when installing trim around a window or door casement or when installing cabinetry, tile, or siding.

19 Claims, 4 Drawing Sheets

(56) References Cited

U.S. PATENT DOCUMENTS

| | | | | |
|---|---|---|---|---|
| 6,612,045 B2* | 9/2003 | Kruskamp | ......... | E04F 21/0092 33/526 |
| 7,240,435 B1* | 7/2007 | Dowdakin | ......... | E04F 21/0015 33/194 |
| 7,475,488 B2* | 1/2009 | Symington | ....... | E04F 15/02005 33/526 |
| 7,513,049 B2 | 4/2009 | Williams | | |
| 7,591,073 B1* | 9/2009 | Eckles et al. | ............ | G01B 3/30 33/194 |
| 7,743,517 B1* | 6/2010 | Burgese | .................. | G01B 3/30 33/194 |
| 7,849,607 B2* | 12/2010 | Alvarez | ................ | E04F 21/003 33/194 |
| D721,980 S | 2/2015 | Cupertino | | |
| 2002/0133957 A1* | 9/2002 | Farese | .................. | E04F 21/003 33/194 |
| 2005/0022397 A1* | 2/2005 | Neblo | ................... | E04F 21/003 33/194 |
| 2013/0125407 A1* | 5/2013 | Shapiro | ................... | G01B 3/04 33/485 |
| 2013/0239419 A1* | 9/2013 | Parkin | .................... | E04F 21/00 33/194 |

OTHER PUBLICATIONS

Cupertino, Ronaldo P.; U.S. Provisional Application entitled: Measurement Device With Multiple Defined Distances, having U.S. Appl. No. 61/916,863, filed Dec. 17, 2013, 10 gs.

* cited by examiner

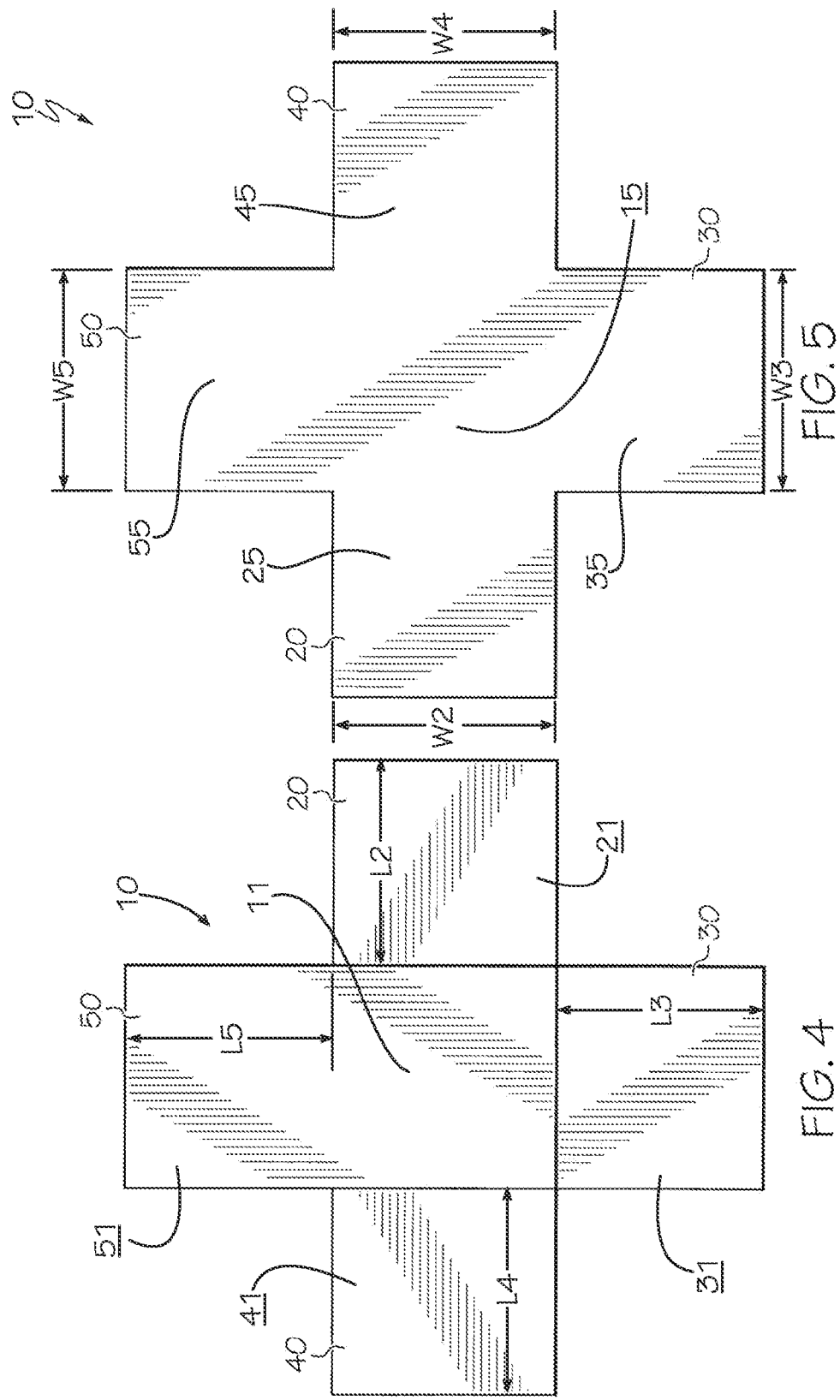

MEASUREMENT DEVICE WITH MULTIPLE FIXED DISTANCES

REFERENCE TO RELATED APPLICATIONS

This application claims priority to U.S. Provisional Application No. 61/916,863, filed Dec. 17, 2013, which is hereby specifically incorporated by reference herein in its entirety.

TECHNICAL FIELD

This disclosure relates to measurement devices. More specifically, this disclosure relates to a measurement device with multiple height measurements.

BACKGROUND

When installing trim, cabinetry, tile and siding, it is sometimes necessary to measure short distances such as those of less than one inch. However, pulling a measuring tape to measure such short distances is impractical and often ineffective.

Accordingly, it can be seen that there exists a need for a better way to measure short distances. It is to the provision of solutions to this and other problems that the present invention is primarily directed.

SUMMARY

Disclosed is a measurement device including a first measurement element including a base surface and an upper surface, the upper surface of the first measurement element spaced apart from the base surface of the first measurement element by a first height; and a second measurement element including a base surface and an upper surface, the upper surface of the second measurement element spaced apart from the base surface of the second measurement element by a second height, the second height greater than the first height and the second measurement element attached to the first measurement element. Also disclosed is a measurement device further comprising a third measurement element and a fourth measurement element, the third measurement element including a base surface and an upper surface, the upper surface of the third measurement element spaced apart from the base surface of the third measurement element by a third height, the fourth measurement element including a base surface and an upper surface, the upper surface of the fourth measurement element spaced apart from the base surface of the fourth measurement element by a fourth height, the third height greater than the second height and the third measurement element attached to the second measurement element, and the fourth height greater than the third height and the fourth measurement element attached to the third measurement element.

Also disclosed is a method of spacing apart two structures using a measurement device, the method including: aligning a base surface of a first measurement element with a first surface of a first structure, the first measurement element having a first height and attached to a second measurement element having a second height, the second height greater than the first height; and aligning an upper surface of the first measurement element with a surface of a second structure, the first measurement element spacing apart the first surface of the first structure and the surface of the second structure at a fixed distance equal to the first height; and attaching the second structure to the first structure.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 4 is an upper side view of the measurement device of FIG. 1.

FIG. 5 is a bottom side view of the measurement device of FIG. 1.

DETAILED DESCRIPTION

Figure 1:
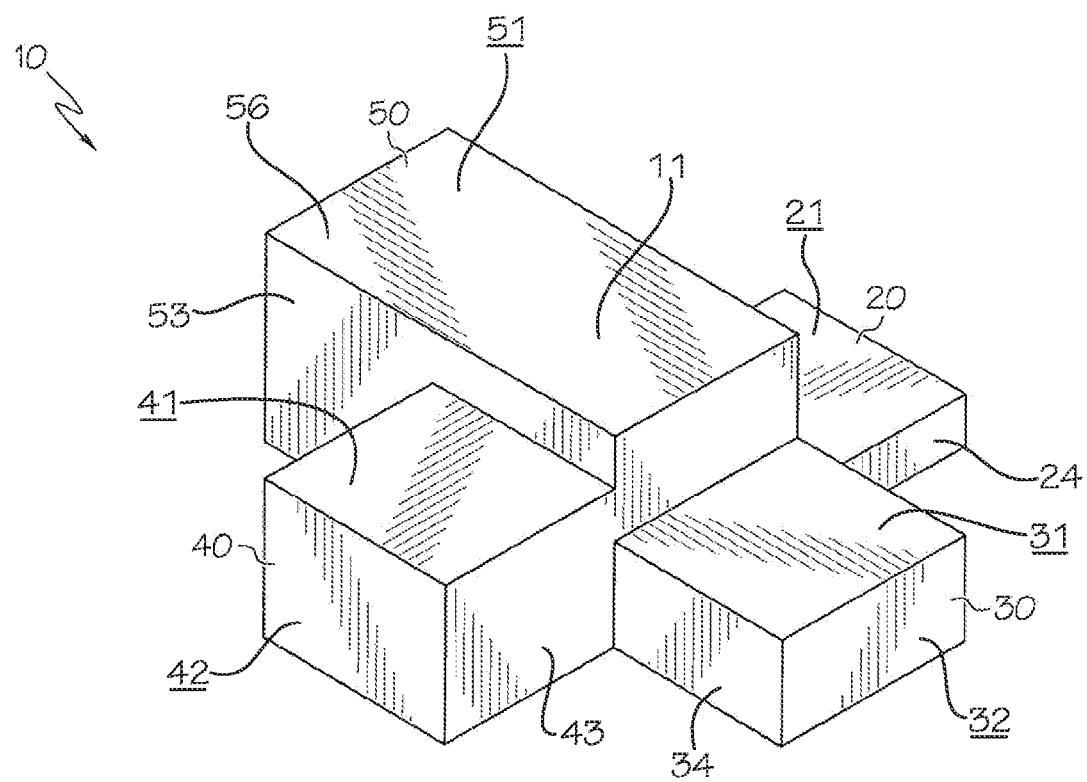
FIG. 1 is a perspective upper view of a measurement device with multiple fixed distances according to the present disclosure.

The present invention relates to a measurement device with multiple pre-defined, fixed-height measurement elements. The measurement device is multi-dimensional and the multiple pre-defined height measurement elements are fixed through a solid element. Each of the solid element measurement elements can function as a spacer to gauge short distances such as when installing trim around a window or door casement. Any of the solid element measurement elements can be placed between the trim and the window or door casement to quickly and precisely provide an exact measurement without a need for eye-ball guessing or measurement tape.

The measurement device can also be used as a scribing tool, with the solid element measurement elements providing different choices for marking cut lines or scribing lines for installation. Further still, the measurement device can be used for setting tool blades and bits. For example, the measurement device can be used to control the cut depth of a table saw blade or a router bit.

The measurement device includes at least two different fixed-height measurement elements. Each fixed measurement element is preferably between zero and 5 inches in height, more preferably between zero and three inches in height, and most preferably between zero and one inch in height. Preferably, the different fixed-height measurement elements are defined by the use of equivalent incremental distances such as one inch and one-half inch. Preferably, the measurement device includes at least four different fixed-height measurement elements, for example one inch, three-quarters inch, one-half inch and one-quarter inch. However, it is contemplated that the measurement device can have five or more different fixed-height measurement elements.

The measurement device is preferably formed as a fixed unitary structure, for example cut from a solid block. The measurement device is constructed of a rigid and durable material such as wood, plastic or metal. The measurement device preferably includes a flat base surface common to each of the different fixed-height measurement elements. The different fixed-height measurement elements are then measured with respect to the flat base surface. The different fixed-height measurement elements are preferably arranged in a horizontally symmetrical pattern, however, it is contemplated that asymmetrical patterns could also be effective.

An example embodiment of the measurement device 10 is shown in FIGS. 1-7. The different fixed-height measurement elements are depicted as a plurality of fingers 20,30,40,50 arranged at right angles with respect to each other. FIG. 5 specifically shows a view of a base surface 15 from which a plurality of widths W2,W3,W4,W5 of the different fingers 20,30,40,50, respectively, are measured. As depicted, the base surface 15 can have a cross shape (see FIGS. 4-5) with at least a one surface of each of the fingers 20,30,40,50 having equivalent surface area and with the fingers 20,30, 40,50 having a length L2,L3,L4,L5, respectively. However, the base surface 15 can be arranged in a different shape with a different number of fingers, and a base portion 25,35,45,55 of each finger can have a different surface area. Each of the first side walls 23,33,43,53 (first side wall 23 shown in FIG. 3 and first side wall 33 shown in FIG. 7) and second side walls 24,34,44,54 (first side wall 44 shown in FIG. 3 and first side wall 54 shown in FIG. 7) of the fingers 20,30,40,50 extends between the base portion 25,35,45,55 of base surface 15 and one of a plurality of upper surfaces 21,31,41,51 (shown particularly in FIG. 4) opposite the base surface 15. As shown, each side wall 23,33,43,53,24,34,44,54 can extend at a right angle with respect to the base surface 15 and the corresponding upper surface 21,31,41,51. In various embodiments, measurement device 10 also includes end wall surfaces 22,32,42,52 (end wall surfaces 22,52 shown in FIG. 3). In the current embodiment, side wall 33 and side wall 54 are part of a side wall 57 extending from side wall 33 to side wall 54 and inclusive of side wall 33 and side wall 54.

Figure 2:
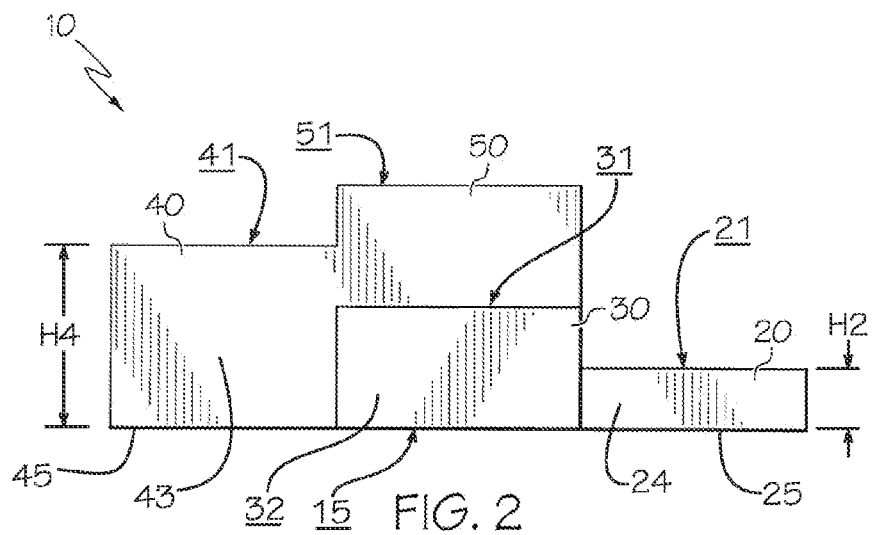
FIG. 2 is a front side view of the measurement device of FIG. 1.
Figure 3:
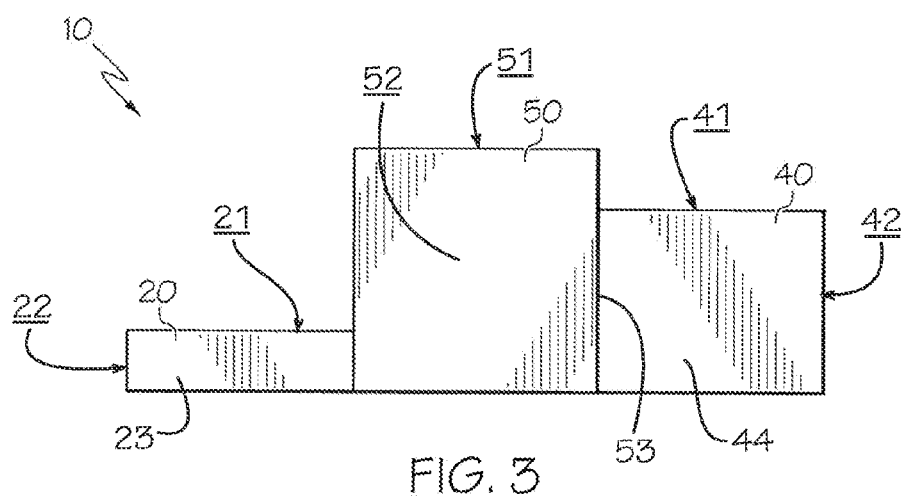
FIG. 3 is a rear side view of the measurement device of FIG. 1.
Figure 6:
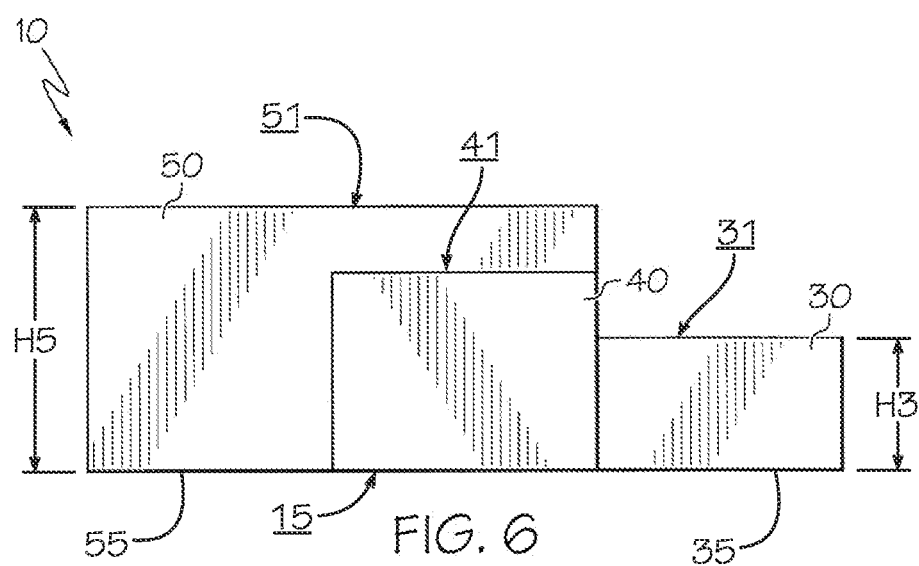
FIG. 6 is a right side view of the measurement device of FIG. 1.
Figure 7:
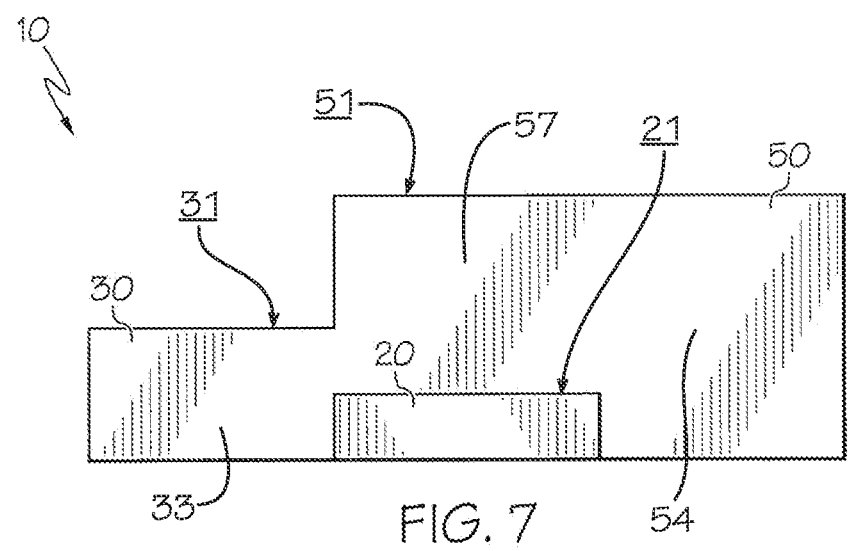
FIG. 7 is a left side view of the measurement device of FIG. 1.

As shown in FIG. 2 and FIG. 6, heights H2,H4 and heights H3,H5, respectively, of fingers 20,40 and fingers 30,50 can be measured between the base surface 15 and the upper surface 21,31,41,51 of each of the fingers 20,30,40,50. The heights H2,H3,H4,H5 can be a first height, a second height, a third height, and a fourth height, respectively. Preferably, the fingers 20,30,40,50 have height measurement distances measuring heights H2,H3,H4,H5 that are sequentially equivalent steps. For example, the height H2 of the finger 20 can represent one-fourth of the height H5 of the finger 50, the height H3 of the finger 30 can represent one-half of the height H5 of the finger 50, and the height H4 of the finger 40 can represent three-fourths of the height H5 of the finger 50. From an alternate method of measurement, a vertical distance between the upper surface 21 of finger 20 and the upper surface 51 of finger 50 represents three-fourths the height H5 of finger 50. The vertical distance between the upper surface 31 of finger 30 and the upper surface 51 of finger 50 represents one-half of the height H5 of finger 50. The vertical distance between the upper surface 41 of finger 40 and the upper surface 51 of finger 50 represents one-fourth of the height H5 of finger 50. Thus, the measurement device 10 can be used for measurement based on the distance between the base surface 15 and the upper surface 21,31,41,51, respectively, of a designated finger 20,30,40,50 or alternatively the distance between the upper surface of a first finger and the upper surface of a second finger.

As shown in FIGS. 1 and 4, since finger 50 has the greatest height H5, upper surface 51 of finger 50 also has the largest upper surface area opposite the base surface 15. For example, the upper surface area of upper surface 51 of finger 50 including both top portion 11 and top portion 56 can be about double the upper surface area of the upper surfaces 21,31,41 of each of fingers 20,30,40, respectively.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

That which is claimed is:

1. A measurement device comprising:
   a first measurement element including a base surface comprising a length and a width, an upper surface opposite from the base surface and comprising a length and a width, and an end wall surface extending from the base surface to the upper surface, the upper surface of the first measurement element spaced apart from the base surface of the first measurement element by a first height, the upper surface of the first measurement element and the end wall surface of the first measurement element lying in separate planes and intersecting each other, the length of the upper surface of the first measurement element being substantially equal to the length of the base surface of the first measurement element, and the width of the upper surface of the first measurement element being substantially equal to the width of the base surface of the first measurement element;
   a second measurement element including a base surface comprising a length and a width, an upper surface opposite from the base surface and comprising a length and a width, and an end wall surface extending from the base surface to the upper surface, the upper surface of the second measurement element spaced apart from the base surface of the second measurement element by a second height, the upper surface of the second measurement element and the end wall surface of the second measurement element lying in separate planes and intersecting each other, the length of the upper surface of the second measurement element being substantially equal to the length of the base surface of the second measurement element, and the width of the upper surface of the second measurement element being substantially equal to the width of the base surface of the second measurement element, the second height greater than the first height and the second measurement element attached to the first measurement element;
   a third measurement element including a base surface comprising a length and a width and an upper surface opposite from the base surface and comprising a length and a width, the upper surface of the third measurement element spaced apart from the base surface of the third measurement element by a third height, the length of the upper surface of the third measurement element being substantially equal to the length of the base surface of the third measurement element, and the width of the upper surface of the third measurement element being substantially equal to the width of the base surface of the third measurement element; and a fourth measurement element including a base surface comprising a length and a width and an upper surface opposite from the base surface and comprising a length and a width, the upper surface of the fourth measurement element spaced apart from the base surface of the fourth measurement element by a fourth height, the third height greater than the second height and the third measurement element attached to the second measurement element, and the fourth height greater than the third height and the fourth measurement element attached to the third measurement element, the length of the upper surface of the fourth measurement element being substantially equal to the length of the base surface of the fourth measurement element, and the width of the upper surface of the fourth measurement element being substantially equal to the width of the base surface of the fourth measurement element;

wherein the base surfaces of the first measurement element, the second measurement element, the third measurement element, and the fourth measurement element together form a common flat base surface; and wherein the base surface and the upper surface of each of the first measurement element, the second measurement element, the third measurement element, and the fourth measurement element are substantially flat.

2. The measurement device of claim 1, wherein the first measurement element, the second measurement element, the third measurement element, and the fourth measurement element each define a solid element, the first height, the second height, the third height, and the fourth height being fixed.

3. The measurement device of claim 1, wherein the measurement device is formed as a unitary structure.

4. The measurement device of claim 1, wherein the measurement device is formed from a rigid material.

5. The measurement device of claim 1, wherein each of the first measurement element and the second measurement element further includes a first side wall and a second side wall, each of the first side wall and the second side wall of the first measurement element extending between the base surface and the upper surface of the first measurement element, and each of the first side wall and the second side wall of the second measurement element extending between the base surface and the upper surface of the second measurement element.

6. The measurement device of claim 5, wherein the first side wall of the first measurement element is at a right angle to the first side wall of the second measurement element.

7. The measurement device of claim 1, wherein each of the third measurement element and the fourth measurement element further comprise an end wall surface, the end wall surface of the third measurement element extending from the base surface of the third measurement element to the upper surface of the third measurement element and the end wall surface of the fourth measurement element extending from the base surface of the fourth measurement element to the upper surface of the fourth measurement element, the upper surface of the third measurement element and the end wall surface of the third measurement element lying in separate planes and intersecting each other, and the upper surface of the fourth measurement element and the end wall surface of the fourth measurement element lying in separate planes and intersecting each other.

8. The measurement device of claim 1, wherein the first measurement element, second measurement element, third measurement element, and fourth measurement element together define a cross shape.

9. The measurement device of claim 1, wherein each of the first height, second height, third height, and fourth height is between zero and one inch.

10. The measurement device of claim 1, wherein a side wall of the second measurement element is at a right angle to a side wall of the first measurement element, a side wall of the third measurement element is at a right angle to the side wall of the second measurement element, the fourth measurement element is at a right angle to the side wall of the third measurement element, and the side wall of the first measurement element is at a right angle to a side wall of the fourth measurement element, the first measurement element, second measurement element, third measurement element, and fourth measurement element arranged by height in a clockwise or a counterclockwise order.

11. The measurement device of claim 1, wherein a difference between the first height and the second height defines a step height and wherein a difference between the second height and the third height and a difference between the third height and the fourth height are both equal to the step height.

12. The measurement device of claim 1, wherein the first height measures one fourth of the fourth height, the second height measures one half of the fourth height, and the third height measures three fourths of the fourth height.

13. The measurement device of claim 1, wherein each of the first height and the second height is between one-quarter inch and one inch.

14. A method of spacing an edge of a trim piece from a first surface of a casement using a measurement device, the method comprising:

aligning an upper surface of a first one of a first measurement element, a second measurement element, and a third measurement element of the measurement device with the first surface of the casement, the measurement device comprising:

the first measurement element including a base surface and the upper surface opposite from the base surface and spaced apart from the base surface of the first measurement element by a first height;

the second measurement element including a base surface and the upper surface opposite from the base surface and spaced apart from the base surface of the second measurement element by a second height, the second height greater than the first height and the second measurement element attached to the first measurement element;

the third measurement element including a base surface and the upper surface opposite from the base surface and spaced apart from the base surface of the third measurement element by a third height, the third height greater than the second height the third measurement element attached to the second measurement element; and a fourth measurement element including a base surface and an upper surface opposite from the base surface and spaced apart from the base surface of the fourth measurement element by a fourth height, the fourth height greater than the first height, the second height, and the third height the fourth measurement element attached to the third measurement element;

aligning a side wall surface of a second one of the first measurement element, the second measurement element, the third measurement element, and the fourth measurement element with a second surface of the casement, the second surface of the casement angled at 90 degrees to the first surface of the casement;

aligning the upper surface of the fourth measurement element with the edge of the trim piece, the measurement device spacing apart the first surface of the casement and the edge of the trim piece at a fixed distance equal to a distance from the upper surface of the fourth measurement element to the upper surface of the first one of the first measurement element, the second measurement element, and the third measurement element; and attaching the trim piece to the second surface of the casement.

15. The method of claim 14, wherein the casement is a one of a window casement and a door casement and the trim piece is a one of a window trim piece and a door trim piece.

16. The method of claim 14, wherein aligning the upper surface of the first one of the first measurement element, the second measurement element, and the third measurement element of the measurement device with the first surface of the casement includes bringing the upper surface of the first one of the first measurement element, the second measurement element, and the third measurement element into contact with the first surface of the casement, and aligning the upper surface of the fourth measurement element with the edge of the trim piece includes bringing the upper surface of the fourth measurement element into contact with the edge of the trim piece.

17. The method of claim 14, wherein the measurement device is formed as a unitary structure, the trim piece is a first trim piece, the casement is a first casement, and the fixed distance is a first fixed distance, the method further comprising repositioning the measurement device so that an edge of a second trim piece can be positioned relative to a first surface of the second casement by a second fixed distance.

18. A method of spacing a tip of a cutting tool from a work surface using a measurement device, the method comprising:

aligning a surface of the measurement device with the work surface, the measurement device comprising:
 a first measurement element;
 a second measurement element attached to the first measurement element and angled at 90 degrees with respect to the first measurement element;
 a third measurement element attached to the second measurement element and angled at 90 degrees with respect to the second measurement element; and
 a fourth measurement element attached to the third measurement element and angled at 90 degrees with respect to the third measurement element and with respect to the first measurement element;
 wherein the first measurement element, the second measurement element, the third measurement element, and the fourth measurement element define a base surface having a cross shape;

positioning a portion of the measurement device above the cutting tool; and adjusting a height of the cutting tool above the work surface to match a height of a portion of the measurement device above the work surface.

19. The method of claim 18, wherein the cutting tool is a one of a table saw blade and a router bit.

* * * * *